United States Patent [19]

Horan

[11] 4,301,983
[45] Nov. 24, 1981

[54] HIGH ACCELERATION PROTECTIVE SEAT
[75] Inventor: John J. Horan, Chalfont, Pa.
[73] Assignee: The United States of America as represented by the Secretary of the Navy, Washington, D.C.
[21] Appl. No.: 88,904
[22] Filed: Oct. 29, 1979
[51] Int. Cl.³ .................. B64D 25/02; B60R 21/10
[52] U.S. Cl. ..................... 244/122 R; 296/65 A; 297/216; 244/122 AG
[58] Field of Search ............ 244/118.5, 118.6, 122 R, 244/122 A, 122 AG, 122 B, 122 AE, 122 AH, 121, 235, 234; 296/65 A; 297/216

[56] References Cited
U.S. PATENT DOCUMENTS

| | | | |
|---|---|---|---|
| 2,365,026 | 12/1944 | Tyler | 244/122 R |
| 2,638,290 | 5/1953 | LeCarme | 244/235 |
| 2,765,130 | 10/1956 | Replogle et al. | 244/122 AG |
| 2,904,286 | 9/1959 | Bleck | 244/122 AG |
| 3,112,955 | 12/1963 | Stolz | 297/216 |
| 3,591,232 | 7/1971 | Simon | 296/216 |
| 3,826,434 | 7/1974 | Beckh | 244/122 R |
| 3,981,465 | 9/1976 | Sinneff et al. | 244/122 R |
| 4,004,763 | 1/1977 | Bunnell et al. | 244/122 AG |
| 4,085,963 | 4/1978 | Bullerdieck | 296/65 A |
| 4,218,035 | 8/1980 | Jordan | 244/122 A |

Primary Examiner—Galen Barefoot
Attorney, Agent, or Firm—R. S. Sciascia; Henry Hansen; Armand M. Vozzo, Jr.

[57] ABSTRACT

A G-protective seat is disclosed for disposing an occupant within a vehicle in a supine tucked posture during high acceleration loading substantially along the Z-axis of the vehicle. At the onset of high Z-axis acceleration, a pair of pivotal leg support members are actuated to fold the legs of the occupant upwardly thereby drawing the knees up to the chest of the occupant in an intermediate tucked position. With the occupant in the tucked position, the seat rotates upward about an axis substantially defined by the occupant's eyes into a supine position for the duration of the high acceleration loading.

8 Claims, 2 Drawing Figures

HIGH ACCELERATION PROTECTIVE SEAT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to aircraft seat structures and more particularly to protective seats that reposition the body of an occupant to improve G-load tolerance during high acceleration flight.

High performance aircraft subject the pilot to high accelerations or G-loads both in the direction of the flight path and along the vertical or Z-axis of the aircraft during curved flight trajectories, such as in sharp turns and steep dive recoveries. These latter radial G-loads, which tend to drain blood away from the brain and toward the lower extremities of the normally erect pilot, have increased in magnitude and frequency with improvements in aircraft structural strength, maneuverability, and power so that as a consequence, the ability of the pilot to withstand the load forces over a sustained period is generally below the performance capabilities of the aircraft. In particular, current combat aircraft possess power and maneuvering capabilities that severely test the pilots G-load tolerance, and as a result, the risks of pilot fatigue, grayout (tunnel vision), and blackout (loss of consciousness) have been significantly increased.

Various approaches have been taken to increase the G-load tolerance of the pilot and other crew members of such high performance aircraft. The use of extensive high-G training (physiological straining and muscular control) and anti-G suits have been found to offer some improvement but cannot match the aircraft capabilities without compromising the pilot's ability to effectively discern, command, and control his aircraft. Substantial improvement in pilot G-load tolerance and performance have been achieved using supinating seats that reposition the pilot from a normally upright position to an extended, reclined posture during high-acceleration maneuvers so that the pilot's retinal-aortic line is more favorably positioned substantially perpendicular to the radial G-load vector. Supinating seats of this type generally include articulated seat and back supporting members that forwardly elevate the lower torso of the pilot without substantially affecting the position of his head. While such supinating seats having extended the pilot's ability to withstand radial G-loads, there remains a need to increase both the level and duration of pilot tolerance to radial G-load exposure so as to match the performance capabilities of developing high performance aircraft. Furthermore, problems of conserving cockpit geometry and maintaining safe conditions for ejection have confronted aircraft developers in accommodating existing supination schemes because of their general feature of substantial pilot elongation requiring forward invasion of the instrument panel for leg clearance.

SUMMARY OF THE INVENTION

Accordingly, it is a general purpose and object of the present invention to provide an improved aircraft seat structure that increases the pilot's G-load tolerance both in level and duration so as to permit full utilization of the aircraft's performance capabilities.

Another object of the present invention is to provide a G-protective seat for high performance aircraft that is highly compatible with existing cockpit configurations and with the required geometry for safe ejection of the pilot in an emergency.

A further object of the present invention is to provide a high-acceleration protective seat for aircraft that is reliable in operation, relatively inexpensive to manufacture, and easily installed within existing aircraft.

Briefly, these and other objects of the present invention are accomplished by a G-protective seat for disposing an occupant within a vehicle in a supine tucked posture during high acceleration loading substantially along the Z-axis of the vehicle. At the onset of high Z-axis acceleration, a pair of pivotal leg support members are actuated to fold the legs of the occupant upwardly thereby drawing the knees up to the chest of the occupant in an intermediate tucked position. With the occupant in the tucked position, the seat rotates upward about an axis substantially defined by the occupant's eyes into a supine position for the duration of the high acceleration loading.

For a better understanding of these and other aspects of the present invention, reference may be made to the following detailed description taken in conjunction with the accompanying drawing in which like reference numerals designate like parts throughout the figures thereof.

DESCRIPTION OF THE PREFERRED EMBODIMENT

Figures 1, 2:
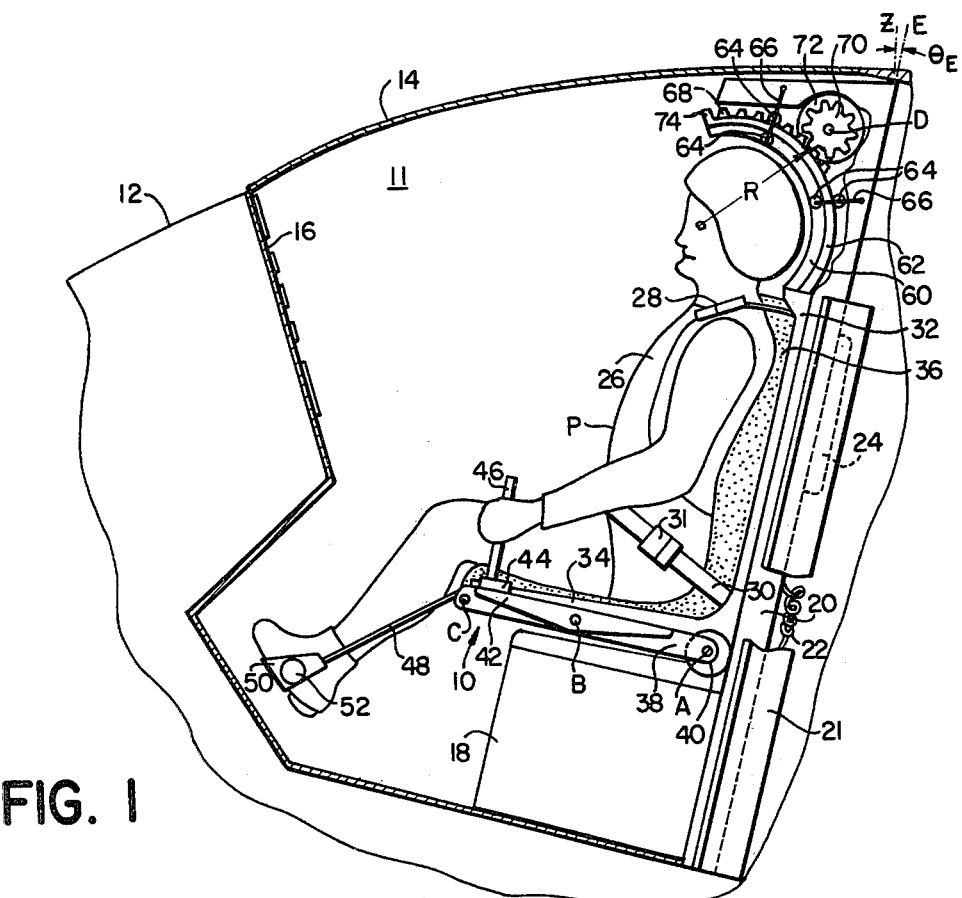
FIG. 1 represents a side elevation view of a G-protective seat according to the present invention supporting a pilot in a normally erect posture within the cockpit of an aircraft.
FIG. 2 represents the seat of FIG. 1 supporting the pilot in a supine tucked posture for high acceleration protection.

Referring now to FIG. 1, there is shown a pilot P supported in a normally erect posture upon a G-protective seat 10 ejectably mounted within a cockpit 11 of a high performance aircraft 12. The front portion of the cockpit 11 is defined overhead by a canopy 4 providing pilot P with a wide view outside of aircraft 12 and forwardly by an instrument panel 16 displaying essential flight information. The seat 10 is normally inclined along a line of ejection E and is equipped with conventional propulsion means housed within an enclosure 18 for ejecting the pilot P in an emergency at an angle $\theta_E$, typically 13 to 15 degrees, from vertical axis Z.

A support frame 20 is slidably mounted along either side thereof to a guide rail 21 fixed to bulkhead structure at the rear of cockpit 11 to establish the ejection angle $\theta_E$. The support frame 20 is a strut-like framework from which the body-supporting portion of seat 10 is rotatably suspended in a manner to be described in greater detail hereinafter, and which may be adapted to accommodate various life-supporting and life-saving equipment including a parachute pack 24. A flexible multi-conductor cable 22 for providing electrical power to seat 10 and transmitting flight control and communication signals from the pilot P to appropriate aircraft systems is routed through frame 20 and connected to the seat at a coupling box 23, better shown in FIG. 2, mounted at the rear of the seat.

The torso-supporting portion of seat 10 has a rigid back support 32 set within support frame 20 in the normally inclined position. A seat pan 34 substantially perpendicular to the base of the back support 32 is rigidly attached thereto to provide support for the buttocks of pilot P. A seat cushion 36 fabricated of a resilient material is secured to the inside surface of back support 32 and disposed downwardly therealong across seat pan 34 for firmly supporting the back and thighs of the pilot P. The seat cushion 36 is split and reinforced at the lower portion thereof for splaying the thighs of the pilot P so that a viewing zone is provided between the legs and feet for continuous observation of the central portion of the instrument panel 16 during seat operation. A torso harness suit 26 worn by the pilot P permits the pilot to be restrained within seat 10 and is coupled to parachute pack 24 by quick-release fasteners 28 on both shoulders. A seat lap belt 30 attached to either side of seat 10 secures the lower torso of pilot P through quick-release buckles 31 coupled to both sides of the torso harness suit 26.

A leg support 38 is located on either side of seat pan 34 in substantially the same plane as the seat pan. The leg supports 38 are L-shaped elements having inwardly directed bases at the forward ends thereof to which the respective ends of seat cushion 36 are attached forward of the front edge of the seat pan 34 beneath the knees of the pilot P. An electric motor 40 is coupled to the rearward end of each leg support 38 along an axis A at the base of back support 32 so that the torque of the motor concomitantly rotates the leg supports about the axis in parallel planes substantially perpendicular to the plane of seat pan 34. The electric motor 40 is a D.C. device electrically connected to provide reversible torques along axis A so that the leg supports 38 are rotated in alternate directions about the axis upon actuation by the pilot P. An arm support 42 is located adjacent to each leg support 38 and pivotally connected thereto along an axis B substantially near the middle of each arm support thereby permitting each arm support to turn about axis B in a plane substantially parallel to the rotational planes of the leg supports. A flight controller 44 is operatively mounted near the forward end of each arm support 42 and provided with a control stick 46 within convenient reach of the pilot P for hands-on control of the flight of the aircraft 12 and of the operation of the G-protective seat 10.

A pair of foot-supporting links 48 (only one being shown) are spaced apart and pivotally connected at the upper ends thereof to the inwardly directed base of each leg support 38 so that the links swing about an axis C beneath the knees of the pilot P. A stirrup 50 is pivotally coupled to the lower ends of each pair of links 48 to support the feet of pilot P at various angles. A servocontroller 52 is attached to each stirrup 50 and electrically coupled to the rudders (not shown) of aircraft 12 thereby permitting the pilot P to control rudder deflection by varying the angular position of his feet.

A rigid arch-shaped shoe 60 having a radius of curvature R substantially about the eyes of the pilot P in the normally erect position partially encircles the head of the pilot and is attached at the lower end thereof to the top of back support 32 for providing rotational movement thereto. The shoe 60 is formed having an integral set of gear teeth 68 projecting radially from the outer arc of the shoe along a sector at the upper end thereof.

A curved ridge 62 formed having substantially the same radius of curvature as shoe 60 is attached to the side surface of the shoe along the outer arc thereof beneath the gear teeth 68 to guide rotational movement therealong. A finger 74 is formed radially extending from one end of ridge 72 and is fixed at the upper end of shoe 60 to limit the rotation thereof.

A gear wheel 70 is rotatably mounted near the top of support frame 20 along a transverse axis D. The gear wheel 70 is laterally positioned within the support frame 20 to intermesh with the gear teeth 68 of shoe 60 and thereby transmit rotational movement to the shoe. An electric motor 72 is coaxially connected to the gear wheel 70 along axis D and secured to the support frame 20 for driving the gear wheel in alternate rotational directions about the axis. The motor 72 like motor 40 is a D.C. device electrically connected to provide reversible torques to gear wheel 70 along axis D upon actuation by the pilot P so that seat 10 may be rotated between the normally inclined position (FIG. 1) and the supine attitude (FIG. 2).

A pair of rollers 64 are rotatably mounted upon each of a pair of connecting bars 66. The bars 66 are rigidly attached to the upper part of support frame 20 near gear wheel 70 and are directed along normals to the curved surfaces of ridge 62. Each pair of rollers 64 are spaced apart upon the respective bars 66 to engage the curved surfaces of ridge 62 and thereby rotatably suspend the body-supporting portion of seat 10 from support frame 20. Engagement of the ridge 62 within the rollers 64 guides the rotation of seat 10 along the arc of the ridge substantially centered at the eyes of pilot P and upwardly limited by finger 74 at the upper end of shoe 60. It should be noted that the relative radial positions of the uppermost roller 64 and the finger 74 along the arc of ridge 62 determine the extent of upward rotational movement of seat 10 necessary to provide a favorable angle of supination $\theta_F$, typically about 65°.

Referring now to FIGS. 1 and 2, the operation of the G-protective seat 10 will now be explained. With the seat 10 in the normally inclined position of FIG. 1, the torso of pilot P is supported upon seat cushion 36 in a substantially erect posture for normal flight maneuvers. Back support 32 and seat pan 34 are rotatably suspended from support frame 20 via arch-shaped shoe 60 and are set within the support frame at an angle $\theta_E$ customary for safe ejection. Leg supports 38 rotatably connected along axis A at the base of back support 32 extend therefrom beneath the thighs of pilot P along either side of seat pan 34. Stirrups 50 pivotally linked to the front of leg supports 38 along axis C are forwardly suspended therefrom to hold the feet of pilot P and provide rudder control. Arm supports 42 adjacent to each leg support 38 and pivotally coupled thereto along axis B rest in substantially the same plane as seat pan 34 and are provided with control stick 46 operatively mounted at the front end thereof within convenient reach of the pilot P.

At the onset of high acceleration maneuvers, the pilot P actuates the G-protective seat 10 to reposition him in the supine tucked posture of FIG. 2. Upon actuation, electric motor 40 produces a clockwise torque along axis A that rotates leg supports 38 concomitantly upward about axis A in parallel planes substantially perpendicular to the plane of seat pan 34. Concomitant rotation of the leg supports 38 lift the legs, splayed by seat cushion 36, beneath the knees and swing the feet, held within stirrups 50, about axis C so that the pilot P is placed in a tucked posture with his knees substantially adjacent to his chest and the soles of his feet approximately coplanar with the plane of the seat pan 34. It should be noted that the tucked posture thus achieved favorably disposes the pilot P against the adverse blood-flow effects of G-loading along the vertical axis Z by arranging the main longitudinal blood vessels in the thighs and torso in a U-tube configuration that hydrostatically applies counterpressure to the main arteries in the torso thereby reducing the drainage of blood from the brain and preventing the lower legs and feet from becoming repositories for the G-drained blood.

As the leg supports 34 are concomitantly rotated upward about axis A, the arm supports 42 are raised alongside the pilot P beneath his arms and are pivoted about axis B to provide substantially horizontal support for the arms of the repositioned pilot during high acceleration loading along the vertical axis Z. The control stick 46 is rotated upward about axis B upon the front of arm support 42 thereby remaining within the convenient reach of the pilot P and being oriented substantially parallel to vertical axis Z so as not to require finger or hand movement along the G vector.

Upon folding the pilot P into the tucked posture, the seat 10 upwardly rotates substantially about the eyes of the pilot until the plane of back support 32 establishes the supination angle $\theta_F$ with the vertical axis Z. With the back support 32 set within support frame 20 in the normally inclined attitude, electric motor 72 is actuated by the pilot P and produces a counterclockwise torque along axis B thereby driving gear wheel 70 in the same counterclockwise direction about the axis. The counterclockwise rotation of gear wheel 70 is transmitted along the mating gear teeth 68 of the arch-shaped shoe 60 so that the shoe moves in a clockwise direction guided by the rolling engagement of ridge 62 between pairs of rollers 64 and limited by the impingement of finger 74 against the uppermost roller. Clockwise movement of the shoe 60 swings the back support 32 forwardly and upwardly within cockpit 11 as the seat pan 34 and stirrups 50 clear the instrument panel 16 thereby disposing the tucked pilot P in the supinated attitude of FIG. 2 without invasion of the plane of the panel. Pilot P is thus disposed in a supine fetal posture for high-G protection having a wide tactical view outboard through canopy 14 and an inboard view of the central portion of the instrument panel 16 between his legs and feet. G-protective seat 10 remains in the folded rotated position for the duration of the high acceleration maneuvers after which the pilot P may be restored to the normally erect posture of FIG. 1 by actuating electric motors 40 and 72 in reverse sequence via control stick 46.

Therefore, it is apparent that the disclosed aircraft seat provides an improved G-protective system for an occupant of a high performance aircraft wherein the body of the occupant is temporarily supported in a supine tucked posture that hydrostatically benefits the blood flow through the body during high acceleration maneuvers to increase the occupant's G-load tolerance both in level and duration so that full utilization of the aircraft's performance capabilities is permitted. In addition, the disclosed G-protective seat provides the pilot of the high performance aircraft with improved high acceleration protection thereby increasing his high-G viewing and control capabilities. Furthermore, the present invention provides a high-acceleration protective seat that is highly compatible with existing cockpit configurations and with the required geometry for safe ejection of the pilot in an emergency.

Obviously, other embodiments and modifications of the present invention will readily come to those of ordinary skill in the art having the benefit of the teachings presented in the foregoing description and drawings. For example, automatic operation of the seat 10 may be provided by an accelerometer directed along the vertical axis Z of the aircraft 12 and electrically coupled to motors 40 and 72 for providing input signals thereto at a predetermined onset acceleration value, for example +3G. It is therefore to be understood that various changes in the details, materials, steps, and arrangements of parts, which have been described and illustrated to explain the nature of the invention, may be made by those skilled in the art within the principle and scope of the invention as expressed in the appended claims.

What is claimed is:

1. A G-protective seat for an occupant in a vehicle, comprising:
   torso support means formed to be rotatably mounted about an axis substantially through the eyes of the occupant within the vehicle so that the torso of the occupant is movable between a substantially erect attitude and a supine posture, said torso means including
   a back support adapted to be rotatably coupled to the vehicle in a substantially erect attitude,
   a seat pan rigidly connected to the bottom of said back support for supporting the pelvic area of the occupant, and
   arcuate means connected to the top of said back support for guiding the rotation thereof substantially about the eyes of the occupant;
   leg support means rotatably connected to said torso support means so that the legs of the occupant are movable between a substantially extended position and a fetal posture; and
   motor means coupled to said torso and leg support means for collaterally rotating said torso and leg support means so that the occupant is moved into and out of a supine fetal posture for increased high-G tolerance.

2. A seat according to claim 1 wherein said torso support means further comprises:
   stop means operatively connected to said arcuate means for limiting upward rotation of said torso support means.

3. A seat according to claim 2 wherein said leg support means comprises:
   a pair of leg supports pivotally coupled to said torso support means to elevate the knees of the occupant substantially adjacent to the chest; and
   bifurcated cushion means attached to said pair of leg supports for splaying the legs of the occupant so that a viewing area is provided therebetween when the knees are elevated.

4. A seat according to claim 1, wherein said motor means comprises:
   a first motor operatively connected to rotate said leg support means;
   a second motor operatively connected to rotate said torso support means; and
   control means for actuating said first and second motors.

5. A seat according to claim 4 wherein said control means comprises:
   manual control means for independently actuating said first and second motor means.

6. A seat according to claim 4 wherein said control means comprises:
   automatic control means for phased actuation of said first and second motor means so that said torso and leg support means rotate unobstructedly within the vehicle.
7. A seat according to claim 4, further comprising:
   arm support means pivotally connected to said leg support means for providing substantially horizontal support for the arms of the occupant in the supine fetal posture.
8. A seat according to claim 7 further comprising:
   stirrup means pivotally linked to said leg support means for carrying the feet of the occupant.

* * * * *